United States Patent
Konishi et al.

(10) Patent No.: US 9,534,137 B2
(45) Date of Patent: Jan. 3, 2017

(54) SINGLE-LIQUID TYPE CLEAR PAINT COMPOSITION AND METHOD OF MULTI-LAYER PAINT FILM FORMATION IN WHICH IT IS USED

(71) Applicant: BASF Coatings GmbH, Münster (DK)

(72) Inventors: Tetsu Konishi, Kanagawa (JP); Atsunori Tajima, Yokohama (JP)

(73) Assignee: BASF Coatings GmbH, Munster (DE)

( * ) Notice: Subject to any disclaimer, the term of this patent is extended or adjusted under 35 U.S.C. 154(b) by 1 day.

(21) Appl. No.: 14/377,613

(22) PCT Filed: Jan. 23, 2013

(86) PCT No.: PCT/IB2013/000080
§ 371 (c)(1),
(2) Date: Aug. 8, 2014

(87) PCT Pub. No.: WO2013/117972
PCT Pub. Date: Aug. 15, 2013

(65) Prior Publication Data
US 2015/0051325 A1   Feb. 19, 2015

(51) Int. Cl.
| | | |
|---|---|---|
| B01F 17/00 | (2006.01) | |
| C09D 167/00 | (2006.01) | |
| C09D 167/02 | (2006.01) | |
| C08G 63/12 | (2006.01) | |
| C08J 7/04 | (2006.01) | |
| C08K 5/3435 | (2006.01) | |
| C08K 5/3492 | (2006.01) | |
| C23C 28/00 | (2006.01) | |

(52) U.S. Cl.
CPC ............ C09D 167/00 (2013.01); C08G 63/12 (2013.01); C08J 7/042 (2013.01); C08K 5/3435 (2013.01); C08K 5/3492 (2013.01); C09D 167/02 (2013.01); C23C 28/00 (2013.01); C08J 2367/02 (2013.01)

(58) Field of Classification Search
CPC ............................ C09D 167/00; C09D 167/02
USPC ........................................................ 524/601
See application file for complete search history.

(56) References Cited

U.S. PATENT DOCUMENTS

| | | | |
|---|---|---|---|
| 5,663,233 A | 9/1997 | Bederke et al. | |
| 6,268,021 B1* | 7/2001 | Flosbach | C08G 18/4063 427/407.1 |
| 2002/0026015 A1 | 2/2002 | Ramesh | |
| 2005/0085569 A1* | 4/2005 | Yuan | C08G 18/4202 524/1 |
| 2008/0226891 A1* | 9/2008 | Chiga | B05D 7/577 428/221 |
| 2009/0117396 A1* | 5/2009 | Furusawa | B05D 7/572 428/458 |
| 2010/0197867 A1 | 8/2010 | Niimi et al. | |
| 2011/0263789 A1 | 10/2011 | Taniguchi et al. | |
| 2015/0175836 A1* | 6/2015 | Yokoyama | C09D 133/14 428/451 |
| 2015/0197665 A1* | 7/2015 | Hsieh | C09D 167/04 427/458 |

FOREIGN PATENT DOCUMENTS

| | | |
|---|---|---|
| EP | 0688840 | 12/1995 |
| JP | 11-506477 | 6/1999 |
| JP | 2001-502009 | 2/2001 |
| JP | 2010-529239 | 8/2010 |
| JP | 2010-285549 | 12/2010 |
| WO | WO-96/34924 | 1/1996 |
| WO | WO-98/16583 | 4/1998 |
| WO | WO-2008/148555 | 12/2008 |
| WO | WO-2010/143032 | 12/2010 |

OTHER PUBLICATIONS

EP 0688840 to Bederke et al., Dec. 1995; machine translation.*
PCT International Search Report in PCT/IB2013/000080, mailed Apr. 29, 2013, 3 pages.
PCT International Preliminary Report on Patentability in PCT/IB2013/000080, mailed Aug. 21, 2014, 7 pages.

* cited by examiner

*Primary Examiner* — Jane L Stanley
(74) *Attorney, Agent, or Firm* — Servilla Whitney LLC

(57) ABSTRACT

A single-liquid type paint composition comprises: a hydroxyl group-containing polyester resin (A) of which the weight average molecular weight is from 1,500 to 8,000, the acid value is from 0 to 50 mgKOH/g, the hydroxyl group value is from 100 to 180 mgKOH/g and the glass transition temperature is from −30 to 0° C. and a crosslinking agent (B) which reacts with hydroxyl groups, wherein the (A) component has been obtained by reacting a polybasic acid (a), a polyhydric alcohol (b) and at least one type of component (c) having at least six carbon atoms selected from among the saturated mono-carboxylic acids, saturated mono-alcohols, saturated glycidyl ethers and saturated glycidyl esters where the proportion by mass of the (c) component is from 20 to 60 mass % with respect to the sum of the solid fraction masses of the (a) to (c) components.

7 Claims, No Drawings

SINGLE-LIQUID TYPE CLEAR PAINT COMPOSITION AND METHOD OF MULTI-LAYER PAINT FILM FORMATION IN WHICH IT IS USED

CROSS-REFERENCE TO RELATED APPLICATIONS

This application is the National Stage entry of PCT/IB2013/000080, filed on Jan. 23, 2013, which claims priority to Japanese Application Number 2012-027823, filed on Feb. 10, 2012 which are incorporated herein by reference in their entireties.

TECHNICAL FIELD

The present invention concerns a novel single-liquid type clear paint composition which can be used in various fields, and especially in the automobile painting field, and a method of multi-layer paint film formation in which said single-liquid type clear paint composition is used.

TECHNICAL BACKGROUND

Generally the method for forming a multi-layer paint film when the object being painted is an automobile involves forming an electro-deposited paint film on the part which is to be painted and curing this by heating and then forming a multi-layer pain film comprising a mid-coat paint film, a colored base paint film and a clear paint film. Here the clear paint film provides various characteristics such as acid resistance, water resistance, weather resistance and the like and not just an excellent paint film appearance.

Generally an acrylic resin which has excellent water resistance, resistance to chemical attack, weather resistance and the like is used as the main resin of a clear coat paint, but clear paint compositions with which clear coat paint films which have excellent characteristics can be obtained by using polyester resins are also known.

A film-forming binder which includes polyester resin which has a specified alicyclic part content and which has specified characteristic values has been disclosed in Patent Document 1 as a clear paint composition in which polyester resin is used.

Furthermore, a coating composition which includes a binder which includes polyester resin which has specified characteristic values, acrylic polyol which has specified characteristic values and crosslinking agent which reacts with hydroxyl groups has been disclosed in Patent Document 2.

However, with the paints disclosed in Patent Document 1 and Patent Document 2 there is a problem in that a good paint film appearance cannot be obtained with the so-called 3C1B type multi-layer paint film forming method which includes a first base paint film forming process in which a first base paint is coated on the object which is being painted and a first base paint film is formed, a second base paint film forming process in which a second base paint is coated over the uncured aforementioned first base paint film and a second base paint film is formed, a clear paint film forming process in which a clear paint is coated over the uncured aforementioned second base paint film and a clear paint film is formed and a heating and curing process in which these three paint film layers are heated and cured at the same time.

Moreover, a hydroxy-functional binding agent which has specified characteristic values has been disclosed in Patent Document 3. In this patent document a polyester resin can be used for the hydroxy-functional binding agent and those where at least one hydroxyl group of the polyester resin has been esterified with at least one non-cyclic aliphatic monocarboxylic acid are especially useful.

Furthermore a paint composition which contains as essential components a carboxyl group-containing polyester resin, carboxyl group-containing radical copolymer, an epoxy group-containing radical copolymer and a crosslinking agent which reacts with hydroxyl groups has been disclosed in Patent Document 4. In this patent document carboxyl group-containing polyester resins obtained by reacting specified components which have six or more carbon atoms with a polyol and then carrying out an addition reaction with an acid anhydride are preferred and, furthermore, a polyester resin can be used for the polyol.

However, with the inventions disclosed in Patent Document 3 and Patent Document 4 again a good paint film appearance is not obtained with a multi-layer paint film forming method with the 3C1B system and, furthermore, it is not possible to obtain paint compositions which have good storage stability under high temperature conditions.

PRIOR ART LITERATURE

Patent Documents

[Patent Document 1]
Japanese Patent Application in Examination 2001-502009
[Patent Document 2]
Japanese Patent Application in Examination H11-506477
[Patent Document 3]
Japanese Patent Application in Examination 2010-529239
[Patent Document 4]
Japanese Unexamined Patent Application Laid Open 2010-285549

OUTLINE OF THE INVENTION

Problems to be Resolved by the Invention

Hence, the present invention is intended to provide single-liquid type clear paint compositions with which paint films which have excellent water resistance and weather resistance and with which an excellent paint film appearance, and especially a good paint film appearance in the multi-layer paint film forming method with a 3C1B system, can be obtained and which, moreover, have a high solid fraction on coating and good storage stability, a method of forming multi-layer paint films in which said single-liquid type clear paint compositions are used, and paint films which have been obtained by coating the aforementioned single-liquid type clear paint compositions.

Means of Resolving These Problems

As a result of thorough research carried out with a view to resolving the abovementioned problems the inventors have discovered that the abovementioned problems can be resolved with a single-liquid type paint composition which includes a hydroxyl group-containing polyester resin which has been produced from specified components and a crosslinking agent which reacts with hydroxyl groups, and the invention is based upon this discovery.

That is to say, the present invention concerns single-liquid type paint compositions which have as essential components a hydroxyl group-containing polyester resin (A) of which the weight average molecular weight is from 1,500 to 8,000, the acid value is from 0 to 50 mgKOH/g, the hydroxyl group value is from 100 to 180 mgKOH/g and the glass transition temperature is from −30 to 0° C. and a crosslinking agent (B) which reacts with hydroxyl groups, wherein the aforementioned (A) component is a hydroxyl group-containing polyester resin which has been obtained by reacting a polybasic acid (a), a polyhydric alcohol (b) and at least one type of component (c) having at least six carbon atoms selected from among the saturated mono-carboxylic acids, saturated mono-alcohols, saturated glycidyl ethers and saturated glycidyl esters where the proportion by mass of the aforementioned (c) component is from 20 to 60 mass % with respect to the sum of the solid fraction masses of the aforementioned (a) to (c) components.

Furthermore, the invention concerns a method for forming multi-layer paint films which includes a first base paint film forming process in which a first base paint is coated on the object which is being painted and a first base paint film is formed, a second base paint film forming process in which a second base paint is coated over the uncured aforementioned first base paint film and a second base paint film is formed, a clear paint film forming process in which clear paint is coated over the uncured aforementioned second base paint film and a clear paint film is formed and a heating and curing process in which these three paint film layers are heated and cured at the same time in which the single-liquid type clear paint compositions described above is used.

Furthermore, the invention concerns the paint films obtained by coating the abovementioned single-liquid type clear paint compositions.

Effect of the Invention

The single-liquid type clear paint compositions of this invention have a high solid fraction on coating and good storage stability and they provide clear paint films which have excellent paint film appearance, water resistance and weather resistance. By using the single-liquid type clear paints of this invention as clear paints it is possible to obtain clear paint films which have a good paint film appearance especially with the method of forming a multi-layer paint film with the 3C1B system.

EMBODIMENT OF THE INVENTION

The single-liquid type clear paints of this invention have a hydroxyl group-containing polyester resin (A) as an essential component and the hydroxyl group-containing polyester resin (A) is obtained by reacting a polybasic acid (a), a polyhydric alcohol (b) and at least one component (c) which has at least six carbon atoms selected from among the saturated mono-carboxylic acids, saturated mono-alcohols, saturated glycidyl ethers and saturated glycidyl esters.

Generally poly-carboxylic acids are used for the polybasic acid (a) and actual examples of the poly-carboxylic acids include phthalic acid, tetrahydrophthalic acid, hexahydrophthalic acid, hexahydroterephthalic acid, 4-methylhexahydrophthalic acid, bicyclo[2,2,1]heptane-2,3-dicarboxylic acid, trimellitic acid, adipic acid, sebacic acid, succinic azeleic acid, fumaric acid, maleic acid, itaconic acid, pyromellitic acid, dimer acid and the like, and their anhydrides, and also 1,4-cyclohexane dicarboxylic acid, isophthalic acid, terephthalic acid, tetrahydro-isophthalic acid, hexahydroisophthalic acid, hexahydroterephthalic acid and the like. These polybasic acids can be used individually and combinations of two or more types can also be used.

The alicyclic di-carboxylic acids or alicyclic di-carboxylic acid anhydrides are preferably used for the polybasic acid (a) from the viewpoints of weather resistance and water resistance. The proportion by mass of alicyclic di-carboxylic acid or di-carboxylic acid anhydride is preferably at least 50 mass %, more desirably at least 70 mass % and most desirably at least 90 mass with respect to the total mass of polybasic acid which is used as the raw material.

Here the alicyclic system is preferably a system which has a group comprising a five- to eight-membered single ring or multi-ring with two or more rings alicyclic group, more desirably a system which has a group comprising a six- or seven-membered single ring or double-ring alicyclic group and most desirably a system which has a group comprising a six-membered single ring alicyclic group. Furthermore, the alicyclic ring may be substituted with substituent groups such as alkyl groups and the like but those which do not have substituent groups such as alkali groups and the like are preferred.

Actual examples of the alicyclic di-carboxylic acids and alicyclic di-carboxylic acid anhydrides include hexahydrophthalic acid, 4-methylhexahydrophthalic acid, bicyclo[2,2,1]heptane-2,3-dicarboxylic acid and the like and their anhydrides, and 1,4-cyclohexanedicarboxylic acid, hexahydroisophthalic acid, hexahydroterephthalic acid and the like. These alicyclic di-carboxylic acids or alicyclic di-carboxylic acid anhydrides can be used individually, and combinations of two or more types can also be used.

Glycols and polyhydric alcohols which have three or more hydroxyl groups can be cited as the preferred polyhydric alcohols (b).

Actual examples of the glycols include ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butanediol, 1,4-butanediol, 1,5-pentanediol, 1,6-hexanediol, 2-butyl-2-ethyl-1,3-propanediol, methylpropanediol, cyclohexanedimethanol, 3,3-diethyl-1,5-pentanediol and the like. Furthermore, examples of polyhydric alcohols which have three or more hydroxyl groups include glycerine, trimethylolethane, trimethylolpropane, di-trimethylolpropane, pentaerythritol, di-pentaerythritol and the like. These polyhydric alcohols can be used individually and combinations of two or more types can also be used.

No particular limitation is imposed upon the number of carbon atoms in the polyhydric alcohol (b) but those with from 4 to 20 carbon atoms are preferred, those with from 4 to 16 are more desirable and those with from 4 to 13 carbon atoms are the most desirable. The number of hydroxyl groups of the polyhydric alcohol (b) is preferably at least four from the viewpoints of water resistance and weather resistance. No particular limitation is imposed as an upper limit for the number of hydroxyl groups of the polyhydric alcohol (b) but those with not more than ten are preferred, those with not more than 8 are more desirable and those with not more than 6 are the most desirable.

Examples of polyhydric alcohols with four or more hydroxyl groups include di-trimethylolpropane, pentaerythritol, di-pentaerythritol and the like, and pentaerythritol is preferred from the viewpoint of weather resistance. Furthermore, the proportion by mass of polyhydric alcohol which has four or more hydroxyl groups is preferably at least 50 mass %, more desirably at least 70 mass % and most desirably at least 90 mass % with respect to the total mass of polyhydric alcohol which is used as the raw material.

The hydroxyl group-containing polyester resin (A) of this invention can be produced by reacting the abovementioned (a) component, the abovementioned (b) component and at least one type of component (c) which has at least six carbon atoms selected from among the saturated mono-carboxylic acids, saturated mono-alcohols, saturated glycidyl ethers and saturated glycidyl esters.

The number of carbon atoms in the (c) component is at least six and, from the viewpoints of the paint film appearance in the 3C1B system multi-layer paint film forming method, the paint film hardness and the water resistance, it is preferably from 7 to 15 and more desirably from 8 to 14. If a (c) component which has less than six carbon atoms is used then there are cases where the paint film appearance and water resistance decline.

Actual examples of saturated mono-carboxylic acids which have at least six carbon atoms include caproic acid, enanthoic acid, caprylic acid, pelargonic acid, capric acid, neodecanoic acid, lauric acid, myristic acid, pentadecanoic acid, palmitic acid, margaric acid, stearic acid and the like. These saturated mono-carboxylic acids which have at least six carbon atoms can be used individually and combinations of two or more types can also be used.

Actual examples of the saturated mono-alcohols which have at least 6 carbon atoms include n-hexanol, n-octanol, n-dodecanol, 2-ethylhexanol, 1-decanol, cyclohexanol and the like. These saturated mono-alcohols which have at least six carbon atoms can be used individually and combinations of two or more types can also be used.

The saturated glycidyl ethers which have at least six carbon atoms are those where the hydrocarbon group which is bound to the glycidyl group via an ether bond is a saturated hydrocarbon group which has at least six carbon atoms.

Actual examples of the saturated glycidyl ether groups which have at least six carbon atoms include 2-ethylhexyl glycidyl ether, 2-methyloctyl glycidyl ether, various commercial α-olefin epoxides (for example that of trade name AOE X24, produced by the Daiseru Kagaku Kogyo Co.) and the like. These saturated glycidyl ethers which have at least six carbon atoms can be used individually and combinations of two or more types can also be used.

The saturated glycidyl esters which have at least six carbon atoms are those where the hydrocarbon group which is bound to the glycidyl group via an ester bond is a hydrocarbon group which has at least six carbon atoms.

Actual examples of the saturated glycidyl ester groups which have at least six carbon atoms include neodecanoic acid glycidyl di-ester (trade name Cardura E10P, produced by the Shell Chemical Co.) and the like, but other commercial fatty acid glycidyl esters can also be used. These saturated glycidyl ester which have at least six carbon atoms can be used individually and combinations of two or more types can also be used.

When producing a hydroxyl group-containing resin (A) of this invention the proportion by mass of the (c) component with respect to the total mass of the solid fractions of the (a) to (c) components is from 20 to 60 mass %, and from the viewpoints of the paint film appearance in the 3C1B system multi-layer film forming method, the paint film hardness and the water resistance it is preferably from 25 to 55 mass % and most desirably from 30 to 50 mass %. If the amount of the abovementioned component is less than 10 mass % then there are cases where the appearance of the paint film in the 3C1B system multi-layer paint film forming method and the water resistance decline, and if it exceeds 60 mass % then there are cases where the paint film hardness is reduced.

Furthermore, no particular limitation is imposed upon the proportions by mass of the (a) component and the (b) component when producing a hydroxyl group-containing polyester resin of this invention and the proportions should be selected in such a way that the acid value and the hydroxyl group value of the hydroxyl group-containing polyester resin (A) are within the prescribed ranges, but the solid fraction of the (a) component with respect to the total solid fraction of the (a) component and the (b) component is preferably from 20 to 80 mass %, more desirably from 30 to 75 mass %, and most desirably from 35 to 70 mass %.

The weight average molecular weight of the hydroxyl group-containing polyester resin (A) produced using the abovementioned method is from 1,500 to 8,000, and from the viewpoints of the paint film appearance in the 3C1B system multi-layer film forming method, the water resistance, the paint film hardness and the solid fraction on coating it is preferably from 2,000 to 7,000 and more desirably from 2,500 to 6,000. If the weight average molecular weight is less than 1,500 then there are cases where the water resistance and the paint film hardness are reduced, and if it exceeds 8,000 then there are cases where the paint film appearance and the solid fraction on coating decline. Moreover, the value of the weight average molecular weight in this invention is that obtained by means of gel permeation chromatography (GPC) with polystyrene as the standard material.

The hydroxyl group value of the hydroxyl group-containing polyester resin (A) is from 100 to 180 mgKOH/g, and from the viewpoints of the paint film appearance with the 3C1B system multi-layer paint film forming method, the paint film hardness and the solid fraction on coating it is preferably from 110 to 170 mgKOH/g, and most desirably from 120 to 160 mgKOH/g. If the hydroxyl group value is less than 100 mgKOH/g then there are cases where the paint film hardness is reduced, and if it exceeds 180 mgKOH/there are cases where the paint film appearance with the 3C1B system multi-layer film forming method and the solid fraction on coating decline.

The acid value of the hydroxyl group-containing polyester resin (A) is from 0 to 50 mgKOH/g and from the viewpoint of the storage stability it is preferably from 0 to 40 mgKOH/g and more desirably from 0 to 30 mgKOH/g. If the acid value exceeds 50 mgKOH/g then there are cases where the storage stability is reduced.

The glass transition temperature of the hydroxyl group-containing polyester resin (A) is from −30 to 0° C., and from the viewpoints of the paint film appearance with the 3C1B system multi-layer paint film forming method, the paint film hardness and the solid fraction on coating it is preferably from −25 to −5° C. and more desirably from −20 to −10° C. If the glass transition temperature is less than −30° C. then there are cases where the paint film hardness is reduced, and if it exceeds 0° C. then there are cases where the paint film appearance with the 3C1B system multi-layer paint film forming method and the solid fraction on coating decline.

Moreover, in this specification the glass transition temperature is the transition start temperature in DSC (differential scanning calorimetry).

A crosslinking agent which reacts with hydroxyl groups is used in a single-liquid type paint composition of this invention. Examples of the crosslinking agents which react with hydroxyl groups include melamine resins, tris(alkoxycarbonylamino)triazines, blocked polyisocyanate compounds and the like. These crosslinking agents which react with hydroxyl groups can be used individually and combinations of two or more types can also be used.

Examples of the melamine resins include the partially or fully metholylated melamine resins obtained by reacting formaldehyde with melamine, the partially or fully alkyl etherified melamine resins obtained by partially or fully etherifying the methylol groups of a methylolated resin with an alcohol component, imino group-containing type melamine resins and mixtures of these melamine resins. Here examples of the alkyl etherified type melamine resins include methylated melamine resins, butylated melamine resins, and methyl/butyl mixed alkylated melamine resins and the like.

Examples of the tris(alkoxycarbonylamino)triazines include tris(methoxycarbonylamino)triazine, tris-(butyloxycarbonylamino)triazine and the like.

The blocked polyisocyanate compounds are those where the isocyanate groups of a polyisocyanate compound have been protected with a blocking agent.

Examples of the polyisocyanate compounds include aliphatic diisocyanates such as hexamethylene diisocyanate, trimethylhexamethylene diisocyanate, dimer acid diisocyanate and the like, ring-like aliphatic diisocyanates such as isopherone diisocyanate, xylylene diisocyanate (XDI), m-xylylene diisocyanate, hydrogenated XDI and the like and, moreover, aromatic diisocyanates such as tolylene diisocyanate (TDI), 4,4-diphenylmethane diisocyanate (MDI), hydrogenated TDI, hydrogenated MDI and the like, and the adducts, biuret forms and isocyanurate forms thereof.

Furthermore, examples of the blocking agents include alcohols such as butanol and the like, oximes such as methyl ethyl ketoxime and the like, lactams such as $\epsilon$-caprolactam and the like, diketones such as acetoacetic acid diesters and the like, imidazoles such as imidazole, 2-ethylimidazole and the like and phenols such as m-cresol and the like.

The proportion by mass of the crosslinking agent (B) included in a single-liquid paint composition of this invention is, from the viewpoints of the paint film hardness, the water resistance and the paint film appearance with the 3C1B system multi-layer paint film forming method, preferably from 10 to 50 mass %, more desirably from 15 to 45 mass %, and most desirably from 20 to 40 mass % in the total paint solid fraction.

One or more of the various types of resin which are generally used in clear paints such as acrylic resins and the like, the various additives such as surface controlling agents, antifoaming agents, surfactants, film-forming promoters, preservatives, ultraviolet absorbers, photo-stabilizers, anti-oxidants, acid catalysts are the like, various rheology-controlling agents and various organic solvents and the like can be included together with the hydroxyl group-containing polyester resin (A) and the crosslinking agent (B) which reacts with hydroxyl groups in a single-liquid type clear paint composition of this invention.

A single-liquid type clear paint composition of this invention may be coated after dilution to a suitable viscosity with an organic solvent or reactive diluent. A single-liquid type clear paint composition of this invention can have a high solid fraction on coating and the high solid fraction on coating is preferably at least 45% and more desirably at least 50%.

No particular limitation is imposed upon the temperature and humidity conditions when coating a single-liquid type clear paint composition of this invention but, for example, the temperature is from 10 to 60° C. and the humidity (relative humidity) is from 50 to 95%. The dry film thickness of the clear paint film is, for example, from 10 to 100 μm. Furthermore, the heating and curing temperature and time in the heating and curing process are, for example, from 120 to 170° C. and from 10 to 60 minutes.

No particular limitation is imposed upon the method whereby a multi-layer paint film is formed using a single-liquid type clear paint composition of this invention, but in particular paint films which have an excellent paint film appearance, water resistance and weather resistance can be obtained by using the compositions as the clear paint in a multi-layer paint film forming process which includes a first base paint film forming process in which a first base paint is coated on the object which is being painted and a first base paint film is formed, a second base paint film forming process in which a second base paint is coated over the uncured aforementioned first base paint film and a second base paint film is formed, a clear paint film forming process in which a clear paint is coated over the uncured aforementioned second base paint film and a clear paint film is formed and a heating and curing process in which the paint films of these three layers are heated and cured at the same time.

Materials where an electro-deposited paint film has been formed on a metal, material where a mid-coat paint film has been formed over an electro-deposited paint film and plastics and the like can be cited as examples of the object which are painted in the method of forming a multi-layer paint film of this invention.

The method of coating the first base paint, the second base paint and the clear paint in the method for forming a multi-layer paint film of this invention is a method which is generally used in the automobile industry, for example air-spray painting, air atomized type electrostatic painting, bell rotation atomization type electrostatic painting or the like.

No particular limitations are imposed upon the first base paint and the second base paint in the method of forming a multi-layer film of this invention and any solvent-based base paint, aqueous solution or aqueous dispersion type base paint can be used, and they may have a solid, metallic or pearl color.

No particular, limitation is imposed upon the temperature and humidity conditions when coating the first base paint and the second base paint but, for example, the temperature is from 10 to 40° C. and the humidity (relative humidity) is from 65 to 85%. The dry film thickness of the first base paint film and the second base paint film is, for example, from 10 to 30 μm for the first base paint film and from 5 to 15 μm for the second base paint film.

At least one preliminary heating process may be included between the first base paint film forming process and the second base paint film forming process and the second base paint film forming process and the clear paint film forming process in the method of forming a multi-layer paint film of this invention. The preliminary heating conditions when a preliminary heating process is included are, for example, from 30 to 100° C. for from 3 to 10 minutes.

No particular limitation is imposed upon the temperature and humidity conditions when coating the clear paint in the method of forming a multi-layer paint film of this invention but, for example, the temperature is from 10 to 40° C. and the humidity (relative humidity) is from 65 to 85%. The dry film thickness of the clear paint film is, for example, from to 100 μm. Furthermore, the heating and curing temperature and time in the heating and curing process are, for example, from 120 to 170° C. and from 10 to 60 minutes.

ILLUSTRATIVE EXAMPLES

The invention is described in more detail below by means of illustrative examples, but the invention is not limited by these illustrative examples. Moreover, in the absence of an indication to the contrary "parts" and "%" in the examples signify "parts by mass" and "mass %".

Preparation Example 1

Production of Hydroxyl Group-Containing Polyester Resin A1

Hexahydrophthalic acid anhydride (35.4 parts by mass) as the (a) component, 19.2 parts by mass of pentaerythritol as the (b) component and 21.2 parts by mass of lauric acid and the (c1) component were introduced into a four-necked flask which had been furnished with a reflux condenser, a thermometer, stirring apparatus and a nitrogen gas delivery tube, the temperature was raised to 180° C., with stirring, and the acid value was measured periodically as a water-elimination condensation polymerization reaction was being carried out. Xylene (60 parts by mass) was added when the acid value reached 110 mgKOH/g and the mixture was cooled to 120° C., 24.2 parts by mass of a saturated glycidyl ester (trade name Cardua E10P, produced by the Shell Chemical Co., neodecanoic acid glycidyl ester) were added as the (c2) component and reacted for 3 hours at 120° C. and the hydroxyl group-containing polyester resin A1 which had the property values shown in Table 1 was obtained.

Preparation Examples 2 to 30

Production of Hydroxyl Group-Containing Polyester Resins A2 to A30

Production of Hydroxyl Group-Containing Polyester Resins A2 to A12, A15 and A17 to A27

The (a) components, (b) components and (c1) components were introduced in accordance with the compounding compositions shown in Table 1 and the acid values were measured periodically while a water-eliminating condensation reaction was being carried out with the same method as in Preparation Example 1. Xylene (60 parts by mass) was added when the acid values reached the values shown in Tables 1 to 5 the mixture was cooled to 120° C. and the (c2) component shown in Table 1 was reacted with the same procedure as in Preparation Example 1 and the hydroxyl group-containing polyester resin A2 to A12, A15 and A17 to A27 which had the property values shown in Tables 1 to 5 were obtained.

Production of Hydroxyl Group-Containing Polyester Resins A13, A14, A16 and A28 to A30

The (a) components, (b) components and (c1) components were introduced in accordance with the compounding compositions shown in Table 1 and the acid values were measured periodically while a water-eliminating condensation reaction was being carried out with the same method as in Preparation Example 1. Xylene (60 parts by mass) was added when the acid values reached the values shown in Tables 1 to 5 and the hydroxyl group-containing polyester resins A13 and A14, A16 and A28 to A30 which had the property values shown in Tables 1 to 5 were obtained.

TABLE 1

| Hydroxyl Group-containing Polyester Resin (A) | | A1 | A2 | A3 | A4 | A5 | A6 |
|---|---|---|---|---|---|---|---|
| Polybasic Acid (a) | Hexahydrophthalic acid anhydride | 35.4 | 33.9 | 38.9 | 40.1 | 32.6 | 36.5 |
| | Hexahydroterephthalic acid | | | | | | |
| | Adipic acid | | | | | | |
| | Isophthalic acid | | | | | | |
| Polyhydric Alcohol (b) | Pentaerythritol | 19.2 | 17.1 | 19.1 | 18.7 | 17.7 | 19.8 |
| | Dipentaerythritol | | | | | | |
| | Di-trimethylolpropane | | | | | | |
| | Trimethylolpropane | | | | | | |
| | 1,6-Hexanediol | | | | | | |
| (c1) | Lauric acid | 21.2 | 18.9 | 14.0 | 15.3 | 27.4 | 14.6 |
| | 1-Decanoic acid | | | | | | |
| | Pentadecanoic acid | | | | | | |
| | Hexanoic acid | | | | | | |
| | Pentanoic acid | | | | | | |
| (c2) | Saturated glycidyl ester (Note 1) | 24.2 | 30.1 | 28.0 | 25.8 | 22.3 | 29.1 |
| | Saturated glycidyl ether (Note 2) | | | | | | |
| Proportion of alicyclic di-carboxylic acid or alicyclic di-carboxylic acid anhydride in the polybasic acid (a) | | 100.0% | 100.0% | 100.0% | 100.0% | 100.0% | 100.0% |
| Proportion of polyhydric alcohol with four or more hydroxyl groups in the polyhydric alcohol (b) | | 100.0% | 100.0% | 100.0% | 100.0% | 100.0% | 100.0% |
| Proportion of the (c1) and (c2) components with six or more carbon atoms with respect to the total amount of the components (a), (b), (c1) and (c2) | | 45.4% | 49.0% | 42.0% | 41.2% | 49.7% | 43.7% |
| Total | | 100 | 100 | 100 | 100 | 100 | 100 |
| Acid value (mgKOH/g) (Note 3) | | 110 | 133 | 115 | 145 | 99 | 121 |
| Amount of water eliminated (g) (Note 4) | | 5.1 | 4.7 | 5.3 | 4.1 | 5.4 | 4.6 |
| Property Values | Resin solid fraction (mass %) | 61.3 | 61.4 | 61.2 | 61.5 | 61.2 | 61.4 |
| | Weight average molecular weight | 3772 | 1590 | 7127 | 3673 | 4092 | 3657 |

TABLE 1-continued

| Hydroxyl Group-containing Polyester Resin (A) | A1 | A2 | A3 | A4 | A5 | A6 |
|---|---|---|---|---|---|---|
| Hydroxyl group value (mgKOH/g) | 139 | 145 | 140 | 141 | 106 | 174 |
| Acid value (mgKOH/g) | 20 | 14 | 10 | 40 | 18 | 10 |
| Glass transition temperature (° C.) | −13.7 | −21.3 | −8.1 | −6.8 | −22.0 | −10.4 |

TABLE 2

| | Hydroxyl Group-containing Polyester Resin (A) | A7 | A8 | A9 | A10 | A11 | A12 |
|---|---|---|---|---|---|---|---|
| Polybasic Acid (a) | Hexahydrophthalic acid anhydride | 25.0 | 38.2 | 18.8 | | 35.3 | 28.7 |
| | Hexahydroterephthalic acid | | | | 37.9 | | |
| | Adipic acid | 12.1 | | | | | |
| | Isophthalic acid | | | 17.4 | | | |
| Polyhydric Alcohol (b) | Pentaerythritol | 15.4 | 20.8 | 19.0 | 18.5 | 10.5 | |
| | Dipentaerythritol | | | | | | 10.9 |
| | Di-trimethylolpropane | | | | | | 17.9 |
| | Trimethylolpropane | | | | | 8.5 | |
| | 1,6-Hexanediol | 4.4 | | | | | |
| (c1) | Lauric acid | 17.3 | 3.8 | 20.9 | 20.4 | 17.6 | 22.9 |
| | 1-Decanoic acid | | | | | | |
| | Pentadecanoic acid | | | | | | |
| | Hexanoic acid | | 11.1 | | | | |
| | Pentanoic acid | | | | | | |
| (c2) | Saturated glycidyl ester (Note 1) | 25.8 | 26.1 | 23.9 | 23.2 | 28.1 | 19.6 |
| | Saturated glycidyl ether (Note 2) | | | | | | |
| Proportion of alicyclic di-carboxylic acid or alicyclic di-carboxylic acid anhydride in the polybasic acid (a) | | 67.3% | 100.0% | 52.0% | 100.0% | 100.0% | 100.0% |
| Proportion of polyhydric alcohol with four or more hydroxyl groups in the polyhydric alcohol (b) | | 77.6% | 100.0% | 100.0% | 100.0% | 55.4% | 100.0% |
| Proportion of the (c1) and (c2) components with six or more carbon atoms with respect to the total amount of the components (a), (b), (c1) and (c2) | | 43.1% | 41.0% | 44.8% | 43.6% | 45.7% | 42.5% |
| Total | | 100 | 100 | 100 | 100 | 100 | 100 |
| Acid value (mgKOH/g) (Note 3) | | 124 | 123 | 113 | 110 | 115 | 84 |
| Amount of water eliminated (g) (Note 4) | | 7.9 | 5.5 | 8.8 | 9.8 | 4.8 | 4.6 |
| Property Values | Resin solid fraction (mass %) | 60.5 | 61.2 | 60.3 | 60.1 | 61.4 | 61.4 |
| | Weight average molecular weight | 3538 | 3492 | 3820 | 3928 | 3786 | 4655 |
| | Hydroxyl group value (mgKOH/g) | 121 | 150 | 137 | 133 | 123 | 145 |
| | Acid value (mgKOH/g) | 21 | 21 | 20 | 19 | 10 | 16 |
| | Glass transition temperature (° C.) | −27.9 | −3.0 | −4.2 | −11.2 | −20.3 | −11.4 |

TABLE 3

| | Hydroxyl Group-containing Polyester Resin (A) | A13 | A14 | A15 | A16 | A17 | A18 |
|---|---|---|---|---|---|---|---|
| Polybasic Acid (a) | Hexahydrophthalic acid anhydride | 17.6 | 28.8 | 35.0 | 20.4 | 26.8 | 16.1 |
| | Hexahydroterephthalic acid | | | | | | |
| | Adipic acid | 8.3 | 12.2 | | 9.7 | | |
| | Isophthalic acid | | | | | | 20.2 |
| Polyhydric Alcohol | Pentaerythritol | 31.1 | 22.6 | 19.0 | | | 18.9 |
| | Dipentaerythritol | | | | | 18.6 | |

TABLE 3-continued

| Hydroxyl Group-containing Polyester Resin (A) | | A13 | A14 | A15 | A16 | A17 | A18 |
|---|---|---|---|---|---|---|---|
| (b) | Di-trimethylolpropane | | | | 28.1 | | |
| | Trimethylolpropane | | | | | | |
| | 1,6-Hexanediol | | | | 18.0 | | |
| (c1) | Lauric acid | | 16.6 | | 23.8 | 27.5 | 20.9 |
| | 1-Decanoic acid | | 19.7 | | | | |
| | Pentadecanoic acid | | | 25.4 | | | |
| | Hexanoic acid | 43.0 | | | | | |
| | Pentanoic acid | | | | | | |
| (c2) | Saturated glycidyl ester (Note 1) | | | | | 27.1 | 23.8 |
| | Saturated glycidyl ether (Note 2) | | | 21 | | | |
| Proportion of alicyclic di-carboxylic acid or alicyclic di-carboxylic acid anhydride in the polybasic acid (a) | | 67.8% | 70.4% | 100.0% | 67.8% | 100.0% | 44.3% |
| Proportion of polyhydric alcohol with four or more hydroxyl groups in the polyhydric alcohol (b) | | 100.0% | 100.0% | 100.0% | 61.0% | 100.0% | 100.0% |
| Proportion of the (c1) and (c2) components with six or more carbon atoms with respect to the total amount of the components (a), (b), (c1) and (c2) | | 43.0% | 36.4% | 46.0% | 23.8% | 54.6% | 44.7% |
| Total | | 100 | 100 | 100 | 100 | 100 | 100 |
| Acid value (mgKOH/g) (Note 3) | | 18 | 26 | 104 | 20 | 103 | 112 |
| Amount of water eliminated (g) (Note 4) | | 11.8 | 10.5 | 5.0 | 8.1 | 4.1 | 8.2 |
| Property Values | Resin solid fraction (mass %) | 59.5 | 59.9 | 61.3 | 60.5 | 61.5 | 60.5 |
| | Weight average molecular weight | 2336 | 3204 | 3812 | 2014 | 7281 | 3828 |
| | Hydroxyl group value (mgKOH/g) | 128 | 117 | 137 | 152 | 113 | 137 |
| | Acid value (mgKOH/g) | 16 | 23 | 20 | 19 | 5 | 20 |
| | Glass transition temperature (° C.) | −1.2 | −4.9 | −19.4 | −18.2 | −24.2 | −2.6 |

TABLE 4

| Hydroxyl Group-containing Polyester Resin (A) | | A19 | A20 | A21 | A22 | A23 | A24 |
|---|---|---|---|---|---|---|---|
| Polybasic Acid (a) | Hexahydrophthalic acid anhydride | 16.4 | 35.7 | 35.2 | 39.1 | 36.8 | 34.7 |
| | Hexahydroterephthalic acid | | | | | | |
| | Adipic acid | 12.9 | | | | | |
| | Isophthalic acid | 5.9 | | | | | |
| Polyhydric Alcohol (b) | Pentaerythritol | 19.3 | 9.0 | 15.5 | 21.1 | 20.0 | 17.5 |
| | Dipentaerythritol | | | | | | |
| | Di-trimethylolpropane | | | | | | |
| | Trimethylolpropane | | 8.9 | | | | |
| | 1,6-Hexanediol | | 3.9 | 13.5 | | | |
| (c1) | Lauric acid | 21.3 | 19.9 | 22.8 | 18.6 | 7.4 | 25.8 |
| | 1-Decanoic acid | | | | | | |
| | Pentadecanoic acid | | | | | | |
| | Hexanoic acid | | | | | | |
| | Pentanoic acid | | | | | | |
| (c2) | Saturated glycidyl ester (Note 1) | 24.2 | 22.6 | 13.0 | 21.2 | 25.1 | 22.0 |
| | Saturated glycidyl ether (Note 2) | | | | | | |
| Proportion of alicyclic di-carboxylic acid or alicyclic di-carboxylic acid anhydride in the polybasic acid (a) | | 46.5% | 100.0% | 100.0% | 100.0% | 100.0% | 100.0% |
| Proportion of polyhydric alcohol with four or more hydroxyl groups in the polyhydric alcohol (b) | | 100.0% | 41.3% | 53.5% | 100.0% | 100.0% | 100.0% |
| Proportion of the (c1) and (c2) components with six or more carbon atoms with respect to the | | 45.5% | 42.5% | 35.8% | 39.8% | 36.4% | 47.8% |

TABLE 4-continued

| Hydroxyl Group-containing Polyester Resin (A) | | A19 | A20 | A21 | A22 | A23 | A24 |
|---|---|---|---|---|---|---|---|
| total amount of the components (a), (b), (c1) and (c2) | | | | | | | |
| Total | | 100 | 100 | 100 | 100 | 89 | 100 |
| Acid value (mgKOH/g) (Note 3) | | 115 | 102 | 78 | 94 | 177 | 98 |
| Amount of water eliminated (g) (Note 4) | | 8.3 | 5.4 | 6.2 | 6.4 | 6.6 | 5.8 |
| Property Values | Resin solid fraction (mass %) | 60.4 | 61.2 | 61.0 | 60.9 | 60.9 | 61.1 |
| | Weight average molecular weight | 3761 | 3775 | 876 | 10084 | 3628 | 6212 |
| | Hydroxyl group value (mgKOH/g) | 139 | 111 | 160 | 132 | 144 | 90 |
| | Acid value (mgKOH/g) | 20 | 19 | 32 | 17 | 62 | 18 |
| | Glass transition temperature (° C.) | −23.1 | −17.9 | −6.8 | −2.9 | −0.9 | −19.0 |

TABLE 5

| Hydroxyl Group-containing Polyester Resin (A) | | A25 | A26 | A27 | A28 | A29 | A30 |
|---|---|---|---|---|---|---|---|
| Polybasic Acid (a) | Hexahydrophthalic acid anhydride | 33.9 | 37.6 | 23.8 | 24.8 | 23.7 | 8.2 |
| | Hexahydroterephthalic acid | | | | | | |
| | Adipic acid | | | 12.5 | | 11.3 | |
| | Isophthalic acid | | | | | | 4.4 |
| Polyhydric Alcohol (b) | Pentaerythritol | 24.0 | 24.1 | 14.0 | 31.3 | | |
| | Dipentaerythritol | | | | | | 26.9 |
| | Di-trimethylolpropane | | | | | 25.0 | |
| | Trimethylolpropane | | | | | | |
| | 1,6-Hexanediol | | | 4.0 | | 24.6 | |
| (c1) | Lauric acid | 22.0 | | 14.4 | | 15.4 | 47.7 |
| | 1-Decanoic acid | | | | | | |
| | Pentadecanoic acid | | | | | | 12.8 |
| | Hexanoic acid | | 18.0 | | | | |
| | Pentanoic acid | | | | 44.0 | | |
| (c2) | Saturated glycidyl ester (Note 1) | 20.1 | 20.2 | 31.3 | | | |
| | Saturated glycidyl ether (Note 2) | | | | | | |
| Proportion of alicyclic di-carboxylic acid or alicyclic di-carboxylic acid anhydride in the polybasic acid (a) | | 100.0% | 100.0% | 65.5% | 100.0% | 67.8% | 65.0% |
| Proportion of polyhydric alcohol with four or more hydroxyl groups in the polyhydric alcohol (b) | | 100.0% | 100.0% | 77.6% | 100.0% | 50.5% | 100.0% |
| Proportion of the (c1) and (c2) components with six or more carbon atoms with respect to the total amount of the components (a), (b), (c1) and (c2) | | 42.1% | 38.3% | 45.7% | 0.0% | 15.4% | 60.5% |
| Total | | 100 | 100 | 100 | 100 | 100 | 100 |
| Acid value (mgKOH/g) (Note 3) | | 82 | 100 | 136 | 11 | 24 | 8 |
| Amount of water eliminated (g) (Note 4) | | 5.9 | 6.8 | 7.5 | 12.9 | 8.3 | 7.6 |
| Property Values | Resin solid fraction (mass %) | 61.1 | 60.8 | 60.7 | 59.2 | 60.4 | 60.6 |
| | Weight average molecular weight | 3027 | 3004 | 3888 | 2320 | 1730 | 5032 |
| | Hydroxyl group value (mgKOH/g) | 198 | 162 | 123 | 103 | 177 | 112 |
| | Acid value (mgKOH/g) | 12 | 25 | 10 | 10 | 22 | 7 |
| | Glass transition temperature (° C.) | −4.8 | 5.5 | −33.2 | 14.7 | −12.0 | −25.0 |

Details of the various compounded components shown in Tables 1 to 5 and complementary facts are indicated below.

(Note 1): Saturated glycidyl ester (trade name Cardura E10P, produced by the Shell Chemical Co., neododecanoic acid glycidyl ester)

(Note 2): Saturated glycidyl ether (trade name AOE X24, produced by the Daiseru Kagaku Kogyo Co., Epoxide of α-olefins having 12 and 14 carbon atoms)

(Note 3): The acid value was measured periodically while the water-elimination condensation reaction of the (a) component, the (b) component and the (c1) component was being carried out and the xylene was added when the acid value was the value shown here.

(Note 4): The amount of water which had been eliminated when the acid value reached the value shown in Note 3.

Example 1

Production and Evaluation of Single-Liquid Type Clear Paint Composition CC1

Production of the Single-Liquid Type Clear Paint Composition CC1

The polyester resin A1 as the (A) component (160 parts by mass), 70 parts by mass of melamine resin (trade name Yuban 220, produced by the Mitsui Kagaku Co., n-butylated melamine resin) as the (B) component, 1.4 parts by mass of ultraviolet absorber (trade name Tinuvin 400, produced by the BASF Co., hydroxyphenyltriazine-based ultraviolet absorber) 1.4 parts by mass of photo-stabilizer (trade name Tinuvin 292, produced by the BASF Co., hindered amine-based photostabilizer) and 0.7 part by mass of surface controlling agent (trade name BYK-325, produced by the BYK Chemie Co., silicone-based surface controlling agent) were mixed together by stirring until uniform in a stainless steel container until and the single-liquid type clear paint composition CC1 was obtained.

Evaluation of the Single-Liquid Type Clear Paint Composition CC1

The single-liquid type clear paint composition CC1 was diluted with an aromatic-based solvent (trade name Solvesso 100, produced by the Exxon Mobil Chemical Co.) and adjusted to a viscosity of 30 seconds (Ford cup. No. 4, 20° C.) to provide a sample, the solid fraction on coating and the storage stability were evaluated and the results are summarized in Table 6.

(1) Solid Fraction on Coating

A test sample (2 g) was transferred onto into a tin-plated dish of diameter 5 cm and heated and dried for 30 minutes at 140° C. and the solid fraction on coating of the single-liquid type clear paint composition was calculated from the mass of the sample before and after heating and drying and evaluated on the basis of the criteria indicated below.

◉: Solid fraction on coating at least 50%
○: Solid fraction on coating at least 45% but less than 50%
X: Solid fraction on coating less than 45%

(2) Storage Stability

A test sample was stored for 30 days at 40° C. and the storage stability was evaluated on the basis of the criteria indicated below in terms of the change in the viscosity (Ford cup No. 4, 20° C.) before and after storage.

◉: Change in viscosity before and after storage less than 10 seconds.
○: Change in viscosity before and after storage 10 seconds or more but less than 20 seconds
X: Change in viscosity before and after storage 20 seconds or more Evaluation of the Paint Film Performance of the Single-Liquid Type Clear Paint Composition CC1

Test pieces for evaluating the paint film performance of the single-liquid type clear paint composition CC1 were prepared in the way outlined below, evaluation of the paint film performance was carried out in respect of items (1) to (4) and the results are summarized in Table 6. Moreover, the single-liquid type clear paint composition CC1 was coated after being diluted with an aromatic-based solvent (trade name Solvesso 100, produced by the Exxon Mobil Chemical Co.) and adjusted to a viscosity of 30 seconds (Ford cup. No. 4, 20° C.)

A cationic electro-deposition paint (trade name Canguard No. 500, produced by the BASF Coatings Co.) was electro-deposition coated so as to provide a dry film thickness of 20 µm on a zinc phosphate treated mild steel sheet and baked for 25 minutes at 175° C. to prepare an electro-deposited paint filmed sheet.

A first base paint (trade name Aqua BC-3 (light blue paint color), produced by the BASF Coating Japan Co., a water-based paint) was coated on this electro-deposited paint filmed sheet using a rotary atomization type bell coating machine (trade name Metallic Bell G1-COPES Bell, produced by the ABB company) under coating conditions of 25° C. and 75% (relative humidity) in such a way as to provide a dry film thickness of 20 µm. After coating the sheet was left to stand for 2 minutes at room temperature and then preliminary heating was carried out for 1 minute at 60° C. After cooling to room temperature a second base paint (trade name Aqua BC-3 (metallic paint color), produced by the BASF Coating Japan Co., a water-based paint) was coated over the top in such a way as to provide a dry film thickness of 12 µm and, after being left to stand for 5 minutes at room temperature, preliminary heating was carried out for 3 minutes at 60° C. After the preliminary heating and being left to cool to room temperature the single-liquid type clear paint composition CC1 of this invention was coated in such a way as to provide a dry film thickness of 30 µm. After coating, the sheet was left to stand for 10 minutes at room temperature and then baked for 30 minutes at 140° C. and a test piece was obtained.

(1) Paint Film Appearance

The smoothness of the paint film surface was measured with a Wavescan DOI (trade name, produced by the BYK Gardener Co.) and the paint film appearance of the test piece was evaluated on the basis of the following criteria from the values of Lw and Sw obtained.

◉: Lw less than 5, Sw less than 10
○: Lw less than 5, Sw 10 or more but less than 15
Δ: Lw 5 or more but less than 10 and Sw 15 or more but less than 20
X: Lw 10 or more and Sw 20 or more (2) Paint Film Hardness The paint film hardness was measured in accordance with the JIS K5600-5-4 (1999) "Scratch hardness (pencil hardness) test method" and evaluated on the basis of the following criteria.

○: F or harder
Δ: HB
X: B or below (3) Water Resistance

A water-resistance test piece obtained by immersing a test piece in warm water at 40° C. for 240 hours was evaluated in terms of the change in gloss, change in color and adhesion properties with the methods (3-1) to (3-3) below and evaluated on the basis of the following criteria.

◉: The evaluation of all cases is A
○: The evaluation in one case is B and there is no C evaluation.
Δ: The evaluation in B in two cases but there is no C evaluation.
X: The result of the evaluation is C in at least one case (3-1) Change in Gloss The gloss of the paint films on test pieces which had and had not been subjected to the water resistance test were measured in each case using a micro-TRI-gloss (trade name, produced by the BYK Gardener Co.) and the gloss values at a measuring angle of 60° (the 60° gloss values) were obtained. The gloss retention factor (=60° gloss of the water resistance test piece/60° gloss of the test piece which had not been subjected to the water resistance test) was calculated from these values and evaluation was carried out on the basis of the following criteria.
(A): Gloss retention factor 90% or above
(B): Gloss retention factor 70% or above but less than 90%
(C): Gloss retention factor less than 70%
(3-2) Change in Color
The change in color after the water resistance test was compared by visual observation with an untested test piece and evaluated on the basis of the following criteria.
A: No change in color before and after the water resistance test
B: Slight change in color before and after the water resistance test
C: Pronounced change in color before and after the water resistance test
(3-3) Adhesion Properties
A pattern of one hundred 2 mm×2 mm squares was formed with a cutter knife in the surface of the water resistance test piece paint film in such a way that the cuts reached the base material, cellophane tape was stuck firmly by pressing over the pattern of squares and the end of the tape was peeled away in a single pull at an angle of 45°, the state of peeling of the pattern of squares was observed and an evaluation was made on the basis of the following criteria.
A: No peeling of the paint film
C: Peeling of the paint film
(4) Weather Resistance
A weather resistance test piece obtained by submitting a test piece to a weather resistance test of duration 3,000 hours using a sunshine carbon arc type accelerated weather resistance testing machine (trade name Sunshine Weatherometer S80, produced by the Suga Co.) was evaluated in terms of the change in gloss, change in color and adhesion properties using the methods (4-1) to (4-3) indicated below and the weather resistance was evaluated on the basis of the following criteria.
◉: The evaluation of all cases is A
○: The evaluation in one case is B and there is no C evaluation.
Δ: The evaluation in B in two cases but there is no C evaluation.
X: The result of the evaluation is C in at least one case (4-1) Change in Gloss
The gloss of the paint films on test pieces which had and had not been subjected to the water resistance test were measured in each case using a micro-TRI-gloss (trade name, produced by the BYK Gardener Co.) and the gloss values at a measuring angle of 60° (the 60° gloss values) were obtained. The gloss retention factor (=60° gloss of the water resistance test piece/60° gloss of the test piece which had not been subjected to the water resistance test) was calculated from these values and evaluation was carried out on the basis of the following criteria.
(A): Gloss retention factor 90% or above
(B): Gloss retention factor 70% or above but less than 90%
(C): Gloss retention factor less than 70%
(4-2) Change in Color
The change in color after the water resistance test was compared by visual observation with an untested test piece and evaluated on the basis of the following criteria.
A: No change in color before and after the water resistance test
B: Slight change in color before and after the water resistance test
C: Pronounced change in color before and after the water resistance test
(4-3) Adhesion Properties
A pattern of one hundred 2 mm×2 mm squares was formed with a cutter knife in the surface of the water resistance test piece paint film in such a way that the cuts reached the base material, cellophane tape was stuck firmly by pressing over the pattern of squares and the end of the tape was peeled away in a single pull at an angle of 45°, the state of peeling of the pattern of squares was observed and an evaluation was made on the basis of the following criteria.
A: No peeling of the paint film
C: Peeling of the paint film Examples 2 to 26 and Comparative Examples 1 to 10

Production and Evaluation of the Single-Liquid Type Clear Paint Compositions CC2 to CC36

The single-liquid type clear paint compositions CC2 to CC36 were produced using the same procedure as in Example 1 in accordance with the compounding compositions shown in Tables 6 to 11, the various aspects of the paint performance and paint film performance were evaluated and the results are summarized in Tables 6 to 11.

TABLE 6

|  |  | Single-liquid type Clear Paint Composition | | | | | | |
|---|---|---|---|---|---|---|---|---|
|  |  | Ex. 1 CC1 | Ex. 2 CC2 | Ex. 3 CC3 | Ex. 4 CC4 | Ex. 5 CC5 | Ex. 6 CC6 | Ex. 7 CC7 |
| Hydroxyl group-containing polyester resin (A) |  | A1 160 | A2 160 | A3 160 | A4 160 | A5 160 | A6 160 | A7 160 |
| Crosslinking Agent | Melamine resin (Note 5) | 70 | 70 | 70 | 70 | 70 | 70 | 70 |
|  | Blocked polyisocyanate compound (Note 6) |  |  |  |  |  |  |  |
|  | Tris(methoxycarbonylamino)-triazine (Note 7) |  |  |  |  |  |  |  |
| Others | Ultraviolet absorber (Note 8) | 1.4 | 1.4 | 1.4 | 1.4 | 1.4 | 1.4 | 1.4 |
|  | Photostabilizer (Note 9) | 1.4 | 1.4 | 1.4 | 1.4 | 1.4 | 1.4 | 1.4 |
|  | Surface controlling agent (Note 10) | 0.7 | 0.7 | 0.7 | 0.7 | 0.7 | 0.7 | 0.7 |
| Total |  | 233.5 | 233.5 | 233.5 | 233.5 | 233.5 | 233.5 | 233.5 |
| Component (B) in the whole of the paint solid fraction (mass %) |  | 30.0 | 30.0 | 30.0 | 29.9 | 30.0 | 30.0 | 30.2 |

TABLE 6-continued

|  |  | Single-liquid type Clear Paint Composition | | | | | | |
|---|---|---|---|---|---|---|---|---|
|  |  | Ex. 1 CC1 | Ex. 2 CC2 | Ex. 3 CC3 | Ex. 4 CC4 | Ex. 5 CC5 | Ex. 6 CC6 | Ex. 7 CC7 |
| Paint | Solid fraction on coating | ◎ | ◎ | ○ | ◎ | ◎ | ○ | ◎ |
| Performance | Storage stability | ◎ | ◎ | ◎ | ○ | ◎ | ◎ | ◎ |
| Paint | Appearance | ◎ | ◎ | Δ | ○ | ◎ | Δ | ◎ |
| Film | Paint film hardness | ○ | Δ | ○ | ○ | Δ | ○ | Δ |
| Performance | Water resistance | ◎ | ○ | ○ | ○ | ◎ | ○ | ○ |
|  | Weather resistance | ◎ | ◎ | ◎ | ◎ | ◎ | ◎ | ○ |

TABLE 7

|  |  | Single-liquid type Clear Paint Composition | | | | | | |
|---|---|---|---|---|---|---|---|---|
|  |  | Ex. 8 CC8 | Ex. 9 CC9 | Ex. 10 CC10 | Ex. 11 CC11 | Ex. 12 CC12 | Ex. 13 CC13 | Ex. 14 CC14 |
| Hydroxyl group-containing polyester resin (A) |  | A8 160 | A9 160 | A10 160 | A11 160 | A12 160 | A13 160 | A14 160 |
| Crosslinking Agent | Melamine resin (Note 5) | 70 | 70 | 70 | 70 | 70 | 70 | 70 |
|  | Blocked polyisocyanate compound (Note 6) |  |  |  |  |  |  |  |
|  | Tris(methoxycarbonylamino)-triazine (Note 7) |  |  |  |  |  |  |  |
| Others | Ultraviolet absorber (Note 8) | 1.4 | 1.4 | 1.4 | 1.4 | 1.4 | 1.4 | 1.4 |
|  | Photostabilizer Note 9 | 1.4 | 1.4 | 1.4 | 1.4 | 1.4 | 1.4 | 1.4 |
|  | Surface controlling agent (Note 10) | 0.7 | 0.7 | 0.7 | 0.7 | 0.7 | 0.7 | 0.7 |
| Total |  | 233.5 | 233.5 | 233.5 | 233.5 | 233.5 | 233.5 | 233.5 |
| Component (B) in the whole of the paint solid fraction (mass %) |  | 30.0 | 30.3 | 30.4 | 30.0 | 30.0 | 30.6 | 30.5 |
| Paint | Solid fraction on coating | ○ | ○ | ◎ | ◎ | ◎ | ○ | ○ |
| Performance | Storage stability | ◎ | ◎ | ◎ | ◎ | ◎ | ◎ | ◎ |
| Paint | Appearance | Δ | Δ | ◎ | ◎ | ◎ | Δ | ○ |
| Film | Paint film hardness | ○ | ○ | ○ | ○ | ○ | ○ | ○ |
| Performance | Water resistance | Δ | ○ | ◎ | ○ | ◎ | ○ | ○ |
|  | Weather resistance | ◎ | ○ | ◎ | ○ | ○ | ○ | ○ |

TABLE 8

|  |  | Single-liquid type Clear Paint Composition | | | | | |
|---|---|---|---|---|---|---|---|
|  |  | Ex. 15 CC15 | Ex. 16 CC16 | Ex. 17 CC17 | Ex. 18 CC18 | Ex. 19 CC19 | Ex. 20 CC20 |
| Hydroxyl group-containing polyester resin (A) |  | A15 160 | A16 160 | A17 160 | A1 160 | A1 160 | A1 160 |
| Crosslinking Agent | Melamine resin (Note 5) | 70 | 70 | 70 | 30 | 130 | 10 |
|  | Blocked polyisocyanate compound (Note 6) |  |  |  |  |  |  |
|  | Tris(methoxycarbonylamino)-triazine (Note 7) |  |  |  |  |  |  |
| Others | Ultraviolet absorber (Note 8) | 1.4 | 1.4 | 1.4 | 1.2 | 1.8 | 1.0 |
|  | Photostabilizer (Note 9) | 1.4 | 1.4 | 1.4 | 1.2 | 1.8 | 1.0 |
|  | Surface controlling agent (Note 10) | 0.7 | 0.7 | 0.7 | 0.6 | 0.9 | 0.5 |
| Total |  | 233.5 | 233.5 | 233.5 | 193.0 | 294.5 | 172.5 |
| Component (B) in the whole of the paint solid fraction (mass %) |  | 30.0 | 30.3 | 29.9 | 15.5 | 44.3 | 5.8 |
| Paint | Solid fraction on coating | ◎ | ◎ | ○ | ◎ | ◎ | ◎ |
| Performance | Storage stability | ◎ | ◎ | ◎ | ◎ | ◎ | ◎ |
| Paint | Appearance | ◎ | Δ | ○ | ◎ | ○ | ◎ |
| Film | Paint film hardness | ○ | ○ | ○ | ○ | ○ | Δ |
| Performance | Water resistance | ◎ | Δ | ◎ | ○ | ○ | Δ |
|  | Weather resistance | ◎ | Δ | ○ | ◎ | ◎ | ◎ |

TABLE 9

| | | Single-liquid type Clear Paint Composition | | | | | |
|---|---|---|---|---|---|---|---|
| | | Ex. 21 CC21 | Ex. 22 CC22 | Ex. 23 CC23 | Ex. 24 CC24 | Ex. 25 CC25 | Ex. 26 CC26 |
| Hydroxyl group-containing polyester resin (A) | | A1 160 | A1 160 | A1 160 | A18 160 | A19 160 | A20 160 |
| Crosslinking Agent | Melamine resin (Note 5) | 200 | 45 | | 70 | 70 | 70 |
| | Blocked polyisocyanate compound (Note 6) | | 20 | | | | |
| | Tris(methoxycarbonylamino)-triazine (Note 7) | | | 84 | | | |
| Others | Ultraviolet absorber (Note 8) | 2.2 | 1.4 | 1.4 | 1.4 | 1.4 | 1.4 |
| | Photostabilizer (Note 9) | 2.2 | 1.4 | 1.4 | 1.4 | 1.4 | 1.4 |
| | Surface controlling agent (Note 10) | 1.1 | 0.7 | 0.7 | 0.7 | 0.7 | 0.7 |
| Total | | 365.5 | 228.5 | 247.5 | 233.5 | 233.5 | 233.5 |
| Component (B) in the whole of the paint solid fraction (mass %) | | 55.0 | 30.0 | 30.0 | 30.3 | 30.3 | 30.0 |
| Paint Performance | Solid fraction on coating | ◎ | ◎ | ◎ | ○ | ◎ | ◎ |
| | Storage stability | ◎ | ◎ | ◎ | ◎ | ◎ | ◎ |
| Paint Film Performance | Appearance | Δ | ◎ | ◎ | Δ | ◎ | ◎ |
| | Paint film hardness | ○ | ○ | ○ | ○ | ○ | ○ |
| | Water resistance | Δ | ◎ | ◎ | ○ | Δ | Δ |
| | Weather resistance | ◎ | ◎ | ◎ | Δ | Δ | Δ |

TABLE 10

| | | Single-liquid type Clear Paint Composition | | | | |
|---|---|---|---|---|---|---|
| | | Comp. Ex 1 CC27 | Comp. Ex 2 CC28 | Comp. Ex. 3 CC29 | Comp. Ex. 4 CC30 | Comp. Ex. 5 CC31 |
| Hydroxyl group-containing polyester resin (A) | | A21 160 | A22 160 | A23 160 | A24 160 | A25 160 |
| Crosslinking Agent | Melamine resin (Note 5) | 70 | 70 | 70 | 70 | 70 |
| | Blocked polyisocyanate compound (Note 6) | | | | | |
| | Tris(methoxycarbonylamino)-triazine (Note 7) | | | | | |
| Others | Ultraviolet absorber (Note 8) | 1.4 | 1.4 | 1.4 | 1.4 | 1.4 |
| | Photostabilizer (Note 9) | 1.4 | 1.4 | 1.4 | 1.4 | 1.4 |
| | Surface controlling agent (Note 10) | 0.7 | 0.7 | 0.7 | 0.7 | 0.7 |
| Total | | 233.5 | 233.5 | 233.5 | 233.5 | 233.5 |
| Component (B) in the whole of the paint solid fraction (mass %) | | 30.1 | 30.1 | 30.1 | 30.1 | 30.1 |
| Paint Performance | Solid fraction on coating | ◎ | X | ○ | ◎ | X |
| | Storage stability | ○ | ◎ | X | ◎ | ◎ |
| Paint Film Performance | Appearance | ○ | X | Δ | ○ | X |
| | Paint film hardness | X | ○ | ○ | X | ○ |
| | Water resistance | X | ◎ | ◎ | ◎ | ◎ |
| | Weather resistance | Δ | ◎ | ◎ | ◎ | ◎ |

TABLE 11

| | | Single-liquid type Clear Paint Composition | | | | |
|---|---|---|---|---|---|---|
| | | Comp. Ex 6 CC32 | Comp. Ex 7 CC33 | Comp. Ex. 8 CC34 | Comp. Ex. 9 CC35 | Comp. Ex. 10 CC36 |
| Hydroxyl group-containing polyester resin (A) | | A26 160 | A27 160 | A28 160 | A29 160 | A30 160 |
| Crosslinking Agent | Melamine resin (Note 5) | 70 | 70 | 70 | 70 | 70 |
| | Blocked polyisocyanate compound (Note 6) | | | | | |
| | Tris(methoxycarbonylamino)-triazine (Note 7) | | | | | |

TABLE 11-continued

| | | Single-liquid type Clear Paint Composition | | | | |
|---|---|---|---|---|---|---|
| | | Comp. Ex 6 CC32 | Comp. Ex 7 CC33 | Comp. Ex. 8 CC34 | Comp. Ex. 9 CC35 | Comp. Ex. 10 CC36 |
| Others | Ultraviolet absorber (Note 8) | 1.4 | 1.4 | 1.4 | 1.4 | 1.4 |
| | Photostabilizer (Note 9) | 1.4 | 1.4 | 1.4 | 1.4 | 1.4 |
| | Surface controlling agent (Note 10) | 0.7 | 0.7 | 0.7 | 0.7 | 0.7 |
| Total | | 233.5 | 233.5 | 233.5 | 233.5 | 233.5 |
| Component (B) in the whole of the paint solid fraction (mass %) | | 30.1 | 30.2 | 30.7 | 30.3 | 30.2 |
| Paint Performance | Solid fraction on coating | X | ◎ | X | ○ | ◎ |
| | Storage stability | ◎ | ◎ | ◎ | ◎ | ◎ |
| Paint | Appearance | X | ◎ | X | X | ◎ |
| Film Performamnce | Paint film hardness | ○ | X | ○ | ○ | X |
| | Water resistance | ◎ | ○ | X | X | ◎ |
| | Weather resistance | ◎ | Δ | ◎ | Δ | Δ |

The details of the various components indicated in Tables 6 to 11 are outlined below.

(Note 5): Melamine resin (trade name Yuban 220), produced by the Mitsui Kagaku Co., n-butylated melamine resin, solid fraction 60 mass %)

(Note 6): Blocked polyisocyanate compound (trade name Desmoure BL3575MPA/SN, produced by the Bayer Material Science Co., HDI-based blocked polyisocyanate, solid fraction 75 mass %)

(Note 7): Tris(methoxycarbonylamino)triazine, solid fraction 50 mass %

(Note 8): Ultraviolet absorber (trade name Tinuvin 400, produced by the BASF Co. hydroxyphenyltriazine-based ultraviolet absorber)

(Note 9): Photostabilizer (trade name Tinuvin 292, produced by the BASF Co., hindered amine-based photostabilizer)

(Note 10): Surface controlling agent (trade name BYK-325, produced by the BYK Chemie Co., silicon-based surface controlling agent)

The invention claimed is:

1. A single-liquid type paint composition comprising:
a hydroxyl group-containing polyester resin (A) of which the weight average molecular weight is from 1,500 to 8,000, the acid value is from 0 to 50 mg KOH/g, the hydroxyl group value is from 100 to 180 mg KOH/g and the glass transition temperature is from −30 to 0° C.; and
a crosslinking agent (B) which reacts with hydroxyl groups;
wherein the (A) component has been obtained by reacting a polybasic acid (a), a polyhydric alcohol (b) and at least one type of component (c) having at least six carbon atoms selected from among the saturated monocarboxylic acids, saturated mono-alcohols, saturated glycidyl ethers and saturated glycidyl esters where the proportion by mass of the (c) component is from 20 to 60 mass% with respect to the sum of the solid fraction masses of the (a) to (c) components.

2. The single-liquid type clear paint composition of claim 1, wherein 50 mass % or more of the aforementioned polybasic acid (a) is alicyclic dicarboxylic acid or alicyclic dicarboxylic acid anhydride.

3. The single-liquid type clear paint composition of claim 1, wherein 50 mass % or more of the polyhydric alcohol (b) is a polyhydric alcohol which has four or more hydroxyl groups.

4. The single-liquid type clear paint composition of claim 1, wherein the crosslinking agent (B) which reacts with hydroxyl groups in included in an amount of from 10 to 50 mass % in the overall paint solid fraction.

5. A method for forming a multi-layer paint film on an object comprising: forming first base paint film by coating a first base paint the object, forming a second base paint film by coating a second base paint over the uncured first base paint film, forming a clear paint film by coating a clear paint over the uncured second base paint film, and heating and curing the three paint film layers at the same time wherein the clear paint comprises the single-liquid type clear paint of claim 1.

6. A paint film which has been obtained by coating the single-liquid type clear paint composition of claim 1.

7. The single-liquid type clear paint composition of claim 1, wherein there are at least two components (c).

* * * * *